United States Patent [19]

Suzuki

[11] Patent Number: 5,008,683

[45] Date of Patent: Apr. 16, 1991

[54] THERMAL TRANSFER RECORDING METHOD

[75] Inventor: Takayuki Suzuki, Saitama, Japan

[73] Assignee: Canon Kabushiki Kaisha, Tokyo, Japan

[21] Appl. No.: 367,262

[22] Filed: Jun. 16, 1989

[30] Foreign Application Priority Data

Jun. 17, 1988 [JP] Japan ................................ 63-148088

[51] Int. Cl.⁵ ................................ G01D 15/10

[52] U.S. Cl. ................................ 346/1.1; 400/208; 346/76 PH

[58] Field of Search ................................ 346/1.1, 76 PH; 400/120, 241, 241.1, 208; 428/212, 913, 195, 218

[56] References Cited

U.S. PATENT DOCUMENTS 4,681,796 7/1987 Maehashi et al. .................... 428/212

4,733,251 3/1988 Murakami et al. ............. 346/76 PH

*Primary Examiner*—Benjamin R. Fuller

*Assistant Examiner*—Gerald E. Preston

*Attorney, Agent, or Firm*—Fitzpatrick, Cella, Harper & Scinto

[57] ABSTRACT

A thermal transfer recording method is disclosed using a thermal transfer material in which a heat-transferable ink layer is deposited on a support, this ink layer being formed so that its melt viscosity decreases from the support side toward the surface side. Recording is carried out by superposing the thermal transfer material over a recording medium and heating the thermal transfer material in accordance with an image signal by means of a recording head. The recording head has a substrate on which a heat-generating member is located. The distance from the center of the heat-generating member to the trailing edge of the substrate is no more than about 1 mm. The thermal transfer material is separated from the recording material immediately after heating.

5 Claims, 5 Drawing Sheets

THERMAL TRANSFER RECORDING METHOD

FIELD OF THE INVENTION AND RELATED ART

The present invention relates to a thermal transfer recording method which is capable of producing recorded images several times by providing a thermal transfer material having a support and a heat-fusible (or heat-softenable) ink layer disposed thereon.

Hitherto, various recording methods have been developed and used in practice for recording apparatus such as word processors and facsimile machines. Among these, the thermal or heat-sensitive recording method including the thermal transfer recording method has been widely used because the apparatus therefor is light in weight, compact, and quite.

The thermal transfer recording method employs a thermal transfer material, comprising generally a heat transferable ink containing a colorant dispersed in a heat-fusible binder applied on a support generally in the form of a sheet. The thermal transfer material is superposed on the recording medium so that the heat-transferable ink layer may contact the recording medium, and the ink layer, melted by supplying heat by a thermal head from the support side of the thermal transfer material, is transferred onto the recording medium, thereby forming a transferred ink image corresponding to the pattern of the heat supplied on the recording medium.

Further, there have recently been proposed various thermal transfer recording methods as disclosed in Japanese Laid-Open Patent Application (KOKAI) Nos. 73994/1987, 40293/1985, 105579/1980, 183297/1983, etc.; and thermal transfer materials as disclosed in Japanese Laid-Open Patent Application No. 181664/1986, 56591/1985, etc., and U.S. Pat. No. 4,681,796, capable of repeatedly providing recorded images plural times.

However, when the thermal transfer materials proposed above are used, there have occurred problems such that the image density of a transferred image provided on a recording medium is insufficient even in the first recording operation using the thermal transfer material, image density unevenness such that a large change in image density can occur in the second recording operation et seq., and the thickness of the thermal transfer material becomes too large. Further, when the thermal transfer material proposed above is used, it is necessary to change the recording conditions as the number of recording operations increases. As a result, such a recording method has some inconveniences that defeat its practical use and so the advantage of the thermal transfer recording method can be impaired.

SUMMARY OF THE INVENTION

An object of the present invention is to solve the above-mentioned problems in the prior art.

A more specific object of the present invention is to provide a thermal transfer recording method which does not impair various advantages of the thermal transfer recording but is capable of retaining high image quality even when recording operations are conducted many times.

According to the present invention, there is provided a thermal transfer recording method, comprising:

providing a thermal transfer material comprising a support and a heat-transferable ink layer which is capable of providing a melt viscosity such that it decreases in the direction of from the support side toward the surface side thereof;

superposing the thermal transfer material on a recording medium so that the heat-transferable ink layer contacts the recording medium;

heating the thermal transfer material from the support side thereof by means of a recording head corresponding to an image signal; and separating the thermal transfer material from the recording medium immediately after the heating;

wherein said recording head comprises a substrate and a heat-generating member disposed thereon; the distance from the center of the heat-generating member to the trailing end of the substrate disposed downstream of the heat-generating member with respect to the movement of the thermal transfer material being 1 mm or shorter.

According to the above-mentioned thermal transfer recording method, a thermal transfer material, of which heat-transferable ink layer is so constituted that the melt viscosity decreases from the support side toward the surface of the heat-transferable ink layer in the thickness direction, is heated by means of a recording head (such as thermal head), and immediately thereafter, the thermal transfer material is peeled or separated from a recording medium. Accordingly, the thermal transfer material is peeled from the recording medium while the heated ink is still in a melted or softened state. As a result, the ink constituting the heat-transferable ink layer is sequentially transferred to the recording medium from the surface side of the ink layer providing a relatively small melt viscosity, whereby high-quality images are provided without decrease in image density, etc., even when recording is effected many times. Particularly, when recording is effected by using a recording head comprising a substrate and a heat-generating member disposed thereon, wherein the distance from the center of the heat-generating member to at least one end portion thereof (disposed downstream of the heat-generating member with respect to the moving direction of the thermal transfer material) is 1 mm or shorter, recorded image may be obtained while retaining higher image quality.

The "substrate" used herein may include a support member on which the heat-generating member is disposed, and a heat sink carrying the support member.

These and other objects, features and advantages of the present invention will become more apparent upon a consideration of the following description of the preferred embodiments of the present invention taken in conjunction with the accompanying drawings, wherein like parts are denoted by like reference numerals. In the description appearing hereinafter, "part(s)" and (%) used for describing quantities are by weight unless otherwise noted specifically.

DETAILED DESCRIPTION OF THE INVENTION

Figure 1:
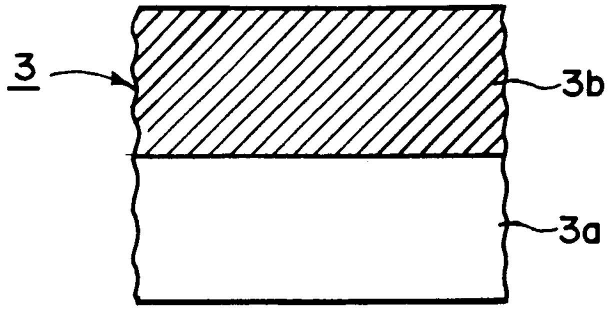
FIG. 1 is a schematic side sectional view showing an embodiment of the thermal transfer material usable in the thermal transfer recording method according to the present invention.

Referring to FIG. 1, a thermal transfer material 3 used in the thermal transfer recording method according to the present invention comprises a support *3a* and an ink layer *3b* disposed thereon.

The ink layer *3b* is so constituted as to provide a change in melt viscosity such that the melt viscosity decreases from the support *3a* side toward the surface side of the ink layer *3b*. The melt viscosity may be decreased continuously or stepwise, from the support *3a* side toward the surface of the ink layer *3b*.

As the support *3a*, it is possible to use films of a plastic such as polyester, aramide resin, nylon and polycarbonate, or paper such as capacitor paper, preferably having a thickness of about 3 to 12 microns. If a sufficient heat resistance and a strength are attained, a support can be thinner than 3 microns. It is sometimes advantageous to coat the back surface (opposite to the face on which the ink layer is disposed) with a layer for supplementing the heat resistance.

The ink layer *3b* may comprise a binder and a colorant.

Examples of the binder used in the ink layer *3b* may include; waxes such as carnauba wax, and paraffin wax; higher fatty acids and their derivatives (including metal salts and esters) such as stearic acid, palmitic acid, aluminum stearate, and lead stearate; and resins including: vinyl resins such as polyamide resin and polyurethane resin; polyvinyl chloride resins (e.g., vinyl chloride-vinylidene chloride copolymers, vinyl chloride-vinyl acetate copolymers, etc.), cellulose resins (e.g., methyl cellulose, ethyl cellulose, etc.), petroleum resins, styrene-type resins such as polystyrene, elastomers such as natural rubber, etc. These known waxes or resins may be used singly or as a mixture of two o more species, as desired. The binder used in the present invention may preferably have a softening point (according to the "ring and ball" method) of 50°-150° C., more preferably 65°-120° C.

In the present invention, various dyes or pigments may be used as the colorant. Specific examples of such colorants may include known dyes or pigments such as carbon black, Into Fast Orange, Brilliant Green B, Oil Yellow GG, Oil Pink and Sudan Blue. These known dyes or pigments may be used singly or as a mixture of two or more species, as desired.

The ink constituting the ink layer *3b* may be obtained by mixing the above-mentioned binder and colorant. The colorant may preferably be contained in the ink layer in an amount of 1-50%, more preferably 5-35%, based on the total weight of the ink layer.

Figure 2:
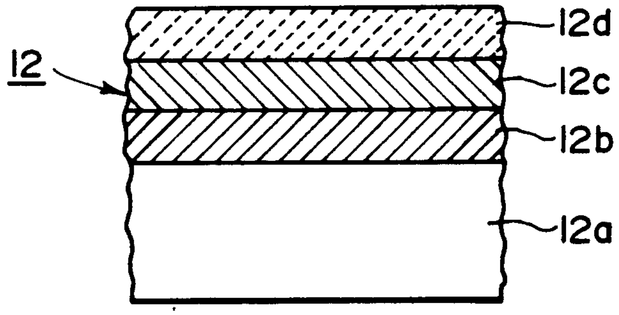
FIGS. 2 to 4 show schematic side sectional views each showing another embodiment of the thermal transfer material usable in the thermal transfer recording method according to the present invention.

The thermal transfer material 12 as shown in FIG. 2 comprises a support *12a* and an ink layer having a multi-layer structure disposed thereon. On the support *12a*, there are successively disposed a first ink layer *12b* having ink of high viscosity, a second ink layer *12c* having ink of a medium viscosity, and a third ink layer *12d* having ink of low viscosity, whereby a three-layer structure is provided. The number of layers constituting the ink layer may preferably be 2 to 6, more preferably 3 to 5, in view of production efficiency and production cost.

The melt viscosity of the ink layer varies corresponding to the quantity of heat supplied by the recording head described herein-after. In the present invention, however, the lowest melt viscosity provided by the portion of the thermal transfer material nearest to the ink layer surface may preferably be about $10$–$10^5$ mPa.S at 120° C., and the largest highest melt viscosity provided by that portion nearest to the support *12a* may preferably be about $10^3$–$10^7$ mPa.S at 120° C.

In the present invention, the melt viscosity of an ink layer is defined as an apparent viscosity which may be measured by means of Flow Tester CFT-500 (mfd. by Shimazu Seisakusho K.K) under the following conditions:

temperature increasing rate: 2° C./min.,
extrusion pressure: 10 Kgf/cm$^2$,
die diameter: 0.5 mm, and
die length: 1.0 mm.

The total thickness of the ink layer (i.e., the thickness of the ink layer *3b* shown in FIG. 1, and the total of thickness of ink layers *12b*, *12c* and *12d* as shown in FIG. 2,) may preferably be 1-10 microns, more preferably 3-10 microns.

The thermal transfer material used in the present invention may be obtained in the following manner. For example, a component constituting the ink layer (such as binder) is dissolved in an organic solvent such as methyl ethyl ketone, xylene tetrahydrofuran and toluene, a colorant is mixed in the resultant solution to obtain a coating liquid, which is then applied onto a support. Further, components constituting the ink layer may be formed into aqueous emulsions by the addition of a dispersant such as a surfactant, and the aqueous emulsions may be applied to form the respective layers.

In order to form an ink layer having a multi-layer structure, several species of inks showing different melt viscosities at a relevant temperature may be prepared and they may successively be applied onto a support to form ink layers arranged in a sequence going from an ink layer having a high melt viscosity to an ink layer having a low melt viscosity. In such a case, contiguous layers may preferably have a melt viscosity difference of $10$–$10^3$ mPa.S, more preferably $10$–$10^2$ mPa.S, at 120° C. Further, the inks providing different melt viscosities may be prepared by mixing two species of materials compatible with each other (e.g., a wax and a resin such as ethylene-vinyl acetate copolymer) while changing the mixing ratio therebetween. When the interfaces between the respective layers providing such a multi-layer structure are mixed or blended by subjecting them to heat treatment, etc., an ink layer *1b* as shown in FIG. 1 may be obtained. Such heat treatment may preferably be conducted at a temperature above the softening points of the respective layers, more preferably 100°-120° C. The ink layer produced in this manner may have a more preferable melt viscosity gradient such that the melt viscosity varies continuously this ink layer may be used more repeatedly.

Figure 3:
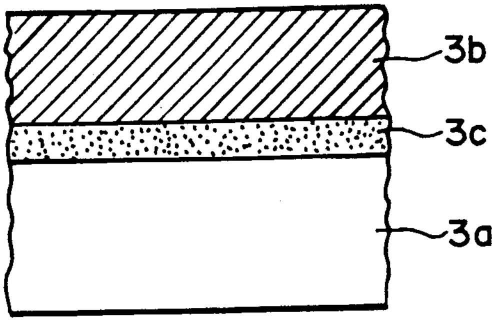

An embodiment as shown in FIG. 3 further comprises an intermediate layer *3c* which is disposed between the support *3a* and the ink layer *3b* as shown in FIG. 1.

Figure 4:
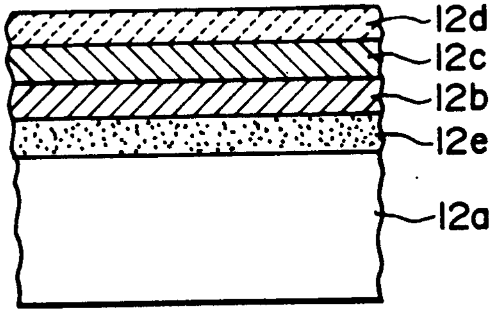

An embodiment as shown in FIG. 4 further comprises an intermediate layer *12e* which is disposed between the support *12a* and the ink layer as shown in FIG. 2.

These intermediate layers (preferably, containing no colorant) help to cause causing the support and ink layer to bond to each other more securely.

Examples of the material used to form the above-mentioned intermediate layer 3c or 12e may include: vinyl acetate-ethylene copolymer, polyurethane resin, acrylic resin, etc. The intermediate layer 3c or 12e may preferably have a thickness of 0.5–5 microns, more preferably 0.5–2 microns. The material of the intermediate layer may preferably have a softening point (preferably 80° C. or higher, more preferably 100° C. or higher) which is higher than that of the ink layer (inclusive of a case wherein it is not heat-softenable), and may preferably have a melt viscosity (preferably $10^6$ mPa.S or larger, more preferably $10^7$ mPa.S or larger) which is larger than that of the ink layer.

When the above-mentioned intermediate layer 3c or 12e is provided, the ink layer does not separate during heating from the support because of adhesive failure at the interface therebetween, even when recording is repeated several times. Accordingly, it is possible to cause cohesive failure in the ink layer possible to apply more stress to the ink layer to cause a more definite cohesive failure in the ink layer at the time of recording, so that the ribbon may be reused a greater number of times than thermal transfer material including no intermediate layer.

Figure 5:
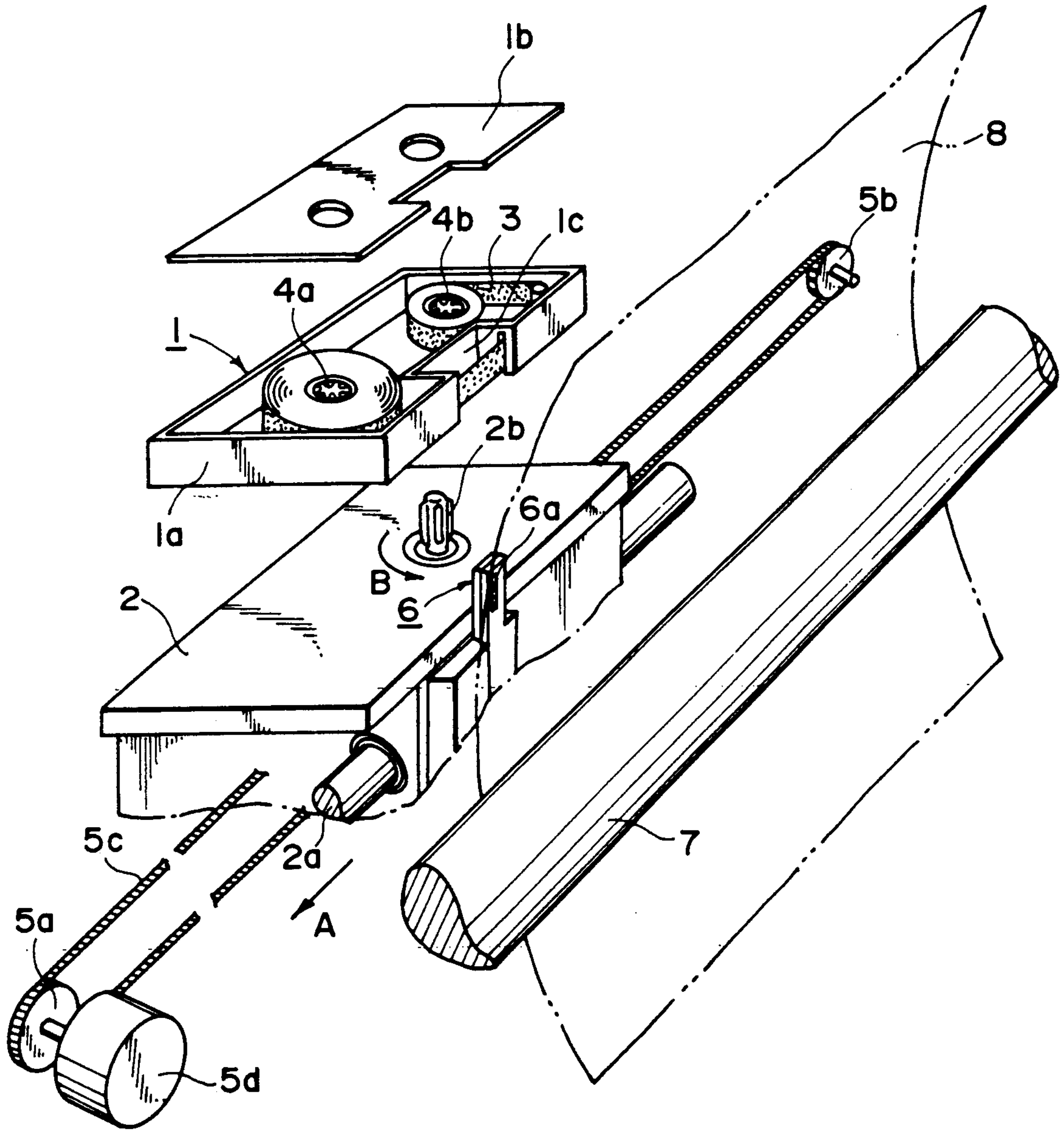
FIG. 5 is a schematic perspective view showing a recording apparatus for practicing the thermal transfer recording method according to the present invention.

Hereinbelow, there is described a recording method according to the present invention using the above-mentioned thermal transfer material and a thermal transfer recording apparatus as shown in FIG. 5.

Referring to FIG. 5, a cassette 1 comprises a lower case 1a and an upper cover 1b, and is to be loaded on a carriage, 2. In the cassette 1, an ink sheet 3 used as a thermal transfer material is wound about a supply core 4a and housed. During use, the ink sheet 3 is led to a concavity 1c of the cassette 1 so as to be exposed thereat, and then is wound about a wind-up core 4b.

Belt 5c supported between pulleys 5a and 5b is connected to the carriage 2. When a carriage motor 5d connected to the pulley 5a is actuated, the carriage 2 can be reciprocally driven in the direction of an arrow A or the reverse thereto while guided by a carriage shaft 2a.

A rotation shaft 2b connected to a winding motor and a friction clutch (not shown) is disposed on carriage 2, and is designed so that it selectively rotates in the direction of arrow B in synchronism with the movement of the carriage 2 during recording only when the carriage 2 moves in the direction of arrow A. The rotation shaft 2b is designed so that it does not rotate if a torque of more than a prescribed value is applied thereto. When a length of the ink sheet 3 is fed from supply core 4a, that length of the ink sheet 3 is wound about the wind-up core 4b, because of the rotation of the rotation shaft 2b which is engaged with the wind-up core 4b.

Reference numeral 6 denotes a recording head having a plurality of heat-generating members (or elements) 6a capable of generating heat corresponding to an image signal. In the recording head 6, the heat-generating members 6a are disposed near the end portion of a substrate, more specifically, at a distance of 1 mm or less from the above-mentioned end portion, in the direction movement of the thermal transfer material 3. The recording head 6 is mounted on the carriage 2 and is disposed so that its position corresponds to that of the concavity 1c of the above-mentioned cassette 1. At the time of recording, the recording head 6 presses, a recording sheet 8 used as a recording medium, the back surface of which back surface is supported by a platen roller 7, against the medium of the above-mentioned ink sheet 3. The recording head 6 moves in the direction of recording (i.e., in the direction of arrow A) along with the movement of the carriage 2. Based on the above-mentioned movement, the ink sheet 3 is sequentially fed from the supply core 4a and is conveyed.

Figure 6:
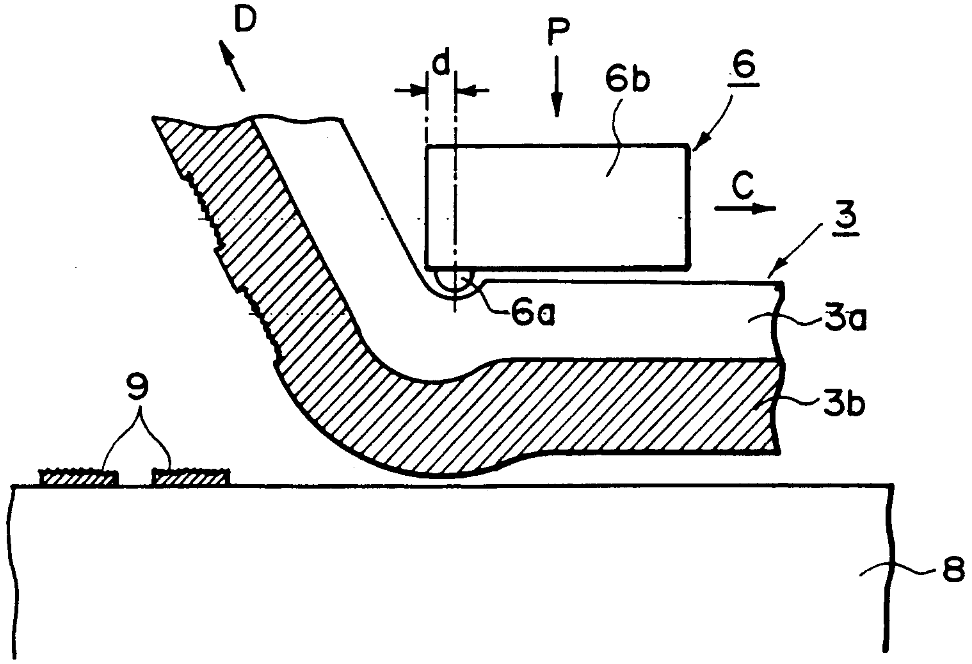
FIGS. 6 to 8 are schematic side sectional views for illustrating the transfer of an ink layer in the thermal transfer recording method according to the present invention.

Now, as shown in FIG. 6, the ink sheet 3 is fed, while superposed on the recording sheet 8 such as paper so that its ink layer 3b contacts the recording sheet 8. A recording head 6 is located on the support 3a side of the ink sheet 3 and has a plurality of heat-generating members 6a disposed on a substrate 6b so that the distance d from the center of the heat-generating member 6a to the end portion of the substrate 6b is 1 mm or less.

At the time of recording, the recording head 6 is moved toward the ink sheet 3 in the direction of an arrow P so that the above-mentioned heat-generating member 6a contacts the support 3a under pressure and the ink layer 3b contacts the recording sheet 8 under pressure. The ink sheet 3 has substantially no relative velocity with respect to the recording sheet 8. While the recording head 6 moves at a constant speed in the arrow C direction, the heat-generating member 6a generates heat corresponding to a prescribed heat application pattern, whereby the ink sheet 3 is supplied with a pattern of heat corresponding to the pattern of an image to be recorded. The ink sheet 3, which has been supplied with heat, is peeled from the recording sheet 8 at the end portion of the substrate 6b of the recording head 6 along with the movement of the recording head 6. As a result, a surface portion of the ink layer 3b melted or softened due to the above-mentioned heating is selectively transferred to the recording sheet 8 to form a recorded image 9 corresponding to the heat application pattern, and thereafter the ink sheet 3 is moved in the arrow D direction.

As described above, the recording head used herein is constituted so that the distance d from the center of the heat-generating member 6a to the end of the substrate 6b is 1 mm or less. Accordingly, the ink sheet 3 is peeled from the recording sheet 8 immediately after it is heated by means of the above-mentioned heat-generating member 6a (preferably 1–18 msec, more preferably 1–10 msec after the heat application), and such peeling is effected while the ink layer 3b supplied with heat is still in a melted or softened state.

In this embodiment, the recorded image 9 is formed on the basis of cohesion failure in the ink layer 3b. In the present invention, the ink layer 3b is constituted so that the melt viscosity provided thereby decreases from the support 3a side to the ink layer surface disposed opposite to the recording sheet 8. Accordingly, the cohesion failure sequentially occurs from a portion of the ink layer 3b which is disposed opposite to the recording sheet 8 and provides a smaller melt viscosity, whereby the surface portion of the ink layer 3b is selectively melted or softened to the transferred to the recording sheet 8.

Figure 7:
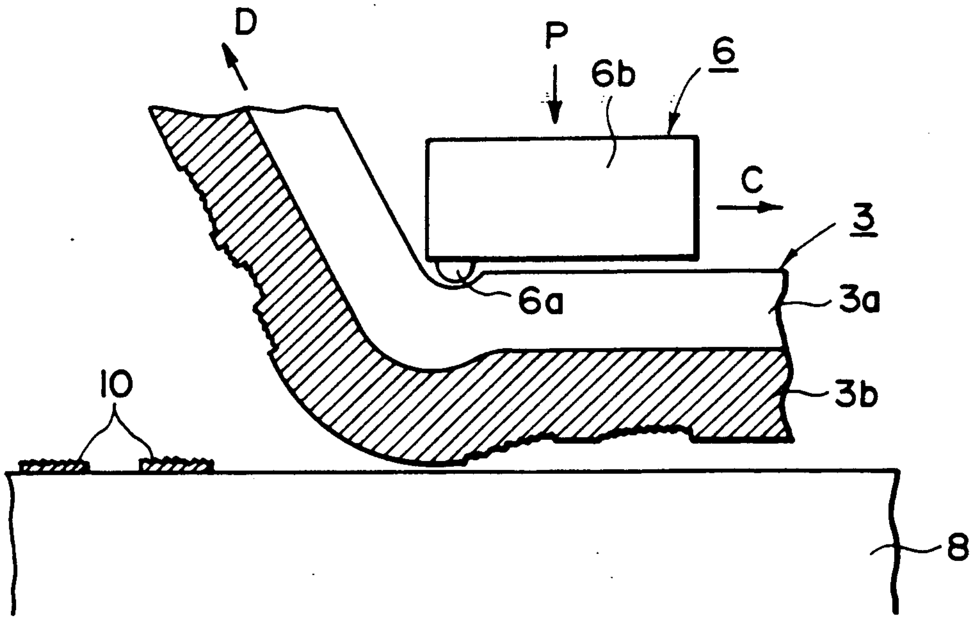

FIG. 7 shows a case wherein an ink sheet 3 once used in again used for recording.

At the time of recording, as shown in FIG. 7, the recording head 6 is moved toward the ink sheet 3 in the direction of an arrow P so that the above-mentioned heat-generating member 6a contacts the support 3a under pressure and the ink layer 3b contacts the recording sheet 8 under pressure. While the recording head 6 moves at a constant speed in the arrow C direction, the heat-generating member *6a* generates heat corresponding to a prescribed heat application pattern, whereby the ink sheet 3 is supplied with a pattern of heat corresponding to the pattern of an image to be recorded. The ink sheet 3, which has been supplied with heat, is peeled from the recording sheet 8 at the end portion of the substrate *6b* of the recording head 6 along with the movement of the recording head 6. As a result, a surface portion of the ink layer *3b* melted or softened due to the above-mentioned heating is selectively transferred to the recording sheet 8 to form a recorded image corresponding to the heat application pattern, and thereafter the ink sheet 3 is moved in the arrow D direction.

More specifically, in such a case, the ink layer *3b* of the ink sheet 3 to be peeled from the recording sheet 8 is still in a melted or softened state. With respect to a portion of the ink layer *3b* which has already been subjected to heat application at the time of first recording operation so that a part of the ink constituting it has been transferred to the recording sheet 8, the remainder ink is transferred to the recording sheet 8 from a surface portion thereof which is disposed opposite to the recording sheet 8 and provides the smallest melt viscosity. Further, another portion of the ink layer *3b* which has not been subjected to heat application at the time of first recording operation is transferred to the recording sheet 8 in the same manner as that in the first recording operation. As a result, a recorded image 10 is formed on the recording sheet 8.

Figure 8:
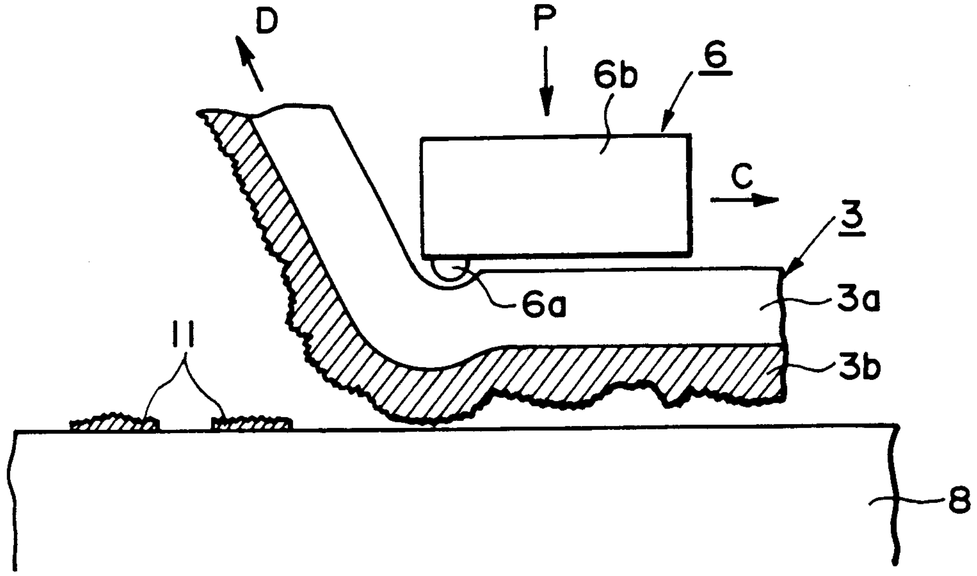

FIG. 8 shows the recording apparatus after the above-mentioned recording operation is effected N times (N≧2) by using the same above-mentioned ink sheet 3, in which the ink layer *3b* is constituted so that the melt viscosity provided thereby decreases from the support *3a* side to the ink layer surface disposed opposite to the recording sheet 8. The cohesion failure sequentially occurs from a portion of the ink layer *3b* which is disposed opposite to the recording sheet 8 and provides a smaller lower melt viscosity. As a result, the surface portion of the ink layer *3b* is selectively melted or softened to be transferred to the recording sheet 8, whereby a recorded image 11 is formed. In the above-mentioned embodiment, the amount of the ink to be transferred to the recording sheet with respect to one heat application is substantially constant from the time of the first recording operation to that of N-th recording operation. As a result, the image density of the recorded image shows substantially no decrease even when the recording is effected repeatedly.

If the distance d from the center b the heat-generating member *6a* of a recording head 6 to the end of the substrate *6b* is longer than 1 mm, the cohesion of the ink layer becomes higher at the time of transfer. This is not preferred because the amount of ink to be transferred to the recording sheet with respect to one heat application is not constant from the time of the first recording operation to that of N-th recording operation.

The above-mentioned distance d is more preferably 0.6 mm or less. In such a recording head, a plurality of heat-generating members may preferably be disposed in a row, the direction of which is perpendicular to the moving direction of the thermal transfer material. The above-mentioned recording head can be produced by cutting the substrate of a conventional recording head.

In a case where an ink sheet which has already been used one or more times is again used for recording, it is preferred to turn the cassette 1 carrying the used ink sheet thereon over (as shown in FIG. 5) and to reload the cassette 1 on the carriage 2. Accordingly, it is preferred to form the concavity *1c* of the cassette 1 on a bisecting line (not shown) which bisects the line joining the supply core *4a* and the wind-up core *4b*.

The thermal transfer materials as shown in FIGS. 2 to 4 may also be used for the same recording method which has been described with reference to FIGS. 5 to 8. In a case where thermal transfer material as shown in FIG. 2 or 3, is used wherein the ink layer has a multilayer structure, when as the recording operation is repeated many times, the interfaces between the respective layers constituting the ink layer becomes less definite because of the pressing force applied to recording head 6 and the heat supplied from a heat-generating member *6a*. As a result, the structure of the ink layer becomes more like that of the ink sheet 3 as shown in FIG. 1 wherein the ink layer is formed so that the melt viscosity continuously changes in the thickness direction.

Hereinbelow, the present invention will be explained is more detail while referring to specific examples of practice.

EXAMPLES

Preparation of thermal transfer materials

Four species of coating liquid were prepared according to the following Table 1.

TABLE 1

| Coating liquid | Component (wt. parts) A | B | C | D | E |
|---|---|---|---|---|---|
| 1 | 48 | 32 | — | 20 | 1 |
| 2 | 56 | 24 | — | 20 | 1 |
| 3 | 64 | 16 | — | 20 | 1 |
| 4 | — | — | 100 | — | 1 |

Component A: Carnauba wax aqueous dispersion (softening point = 75° C.)
Component B: Ethylene-vinyl acetate copolymer aqueous dispersion (Adcote P-147, mfd. by Toyo Moton K.K.) ethylene content = 75%, softening point = 75° C.)
Component C: Vinyl acetate-ethylene copolymer aqueous dispersion (Sumikaflex, mfd. by Sumitomo Kagaku K.K., ethylene content = 20%)
Component D: Carbon black aqueous dispersion
Component E: Fluorine-containing surfactant (Surflon S-141, mfd. by Asahi Glass K.K.)

(The amount of the aqueous dispersions are based on their solid contents.)

The solid content of the above coating liquid 1 provided a melt viscosity of $6\times10^3$ mPa.S, the solid content of the coating liquid 2 provided a melt viscosity of $2\times10^3$ mPa.S, and the solid content of the above coating liquid 3 provided a melt viscosity of $4\times10^2$ mPa.S.

Thermal Transfer Material (I)

The above-mentioned coating liquid 1 was applied onto a 4.5 micron-thick polyethylene terephthalate (hereinafter, referred to as "PET") film and then dried at 80° C. to form a 2.5 micron-thick first layer. Then, the above coating liquid 2 was applied onto the first layer and dried at 80° C. to form a 2.5 micron-thick second layer. Further, the above coating liquid 3 was applied onto the second layer and dried at 80° C. to form a 2.5 micron-thick third layer. Finally, the resultant product was left standing in a drier at 150° C. for 1 min., to obtain a thermal transfer material (I).

Thermal Transfer Material (II)

The above-mentioned coating liquid 4 was applied onto a 4.5 micron-thick PET film and then dried to form a 1 micron-thick first layer. Then, the above-mentioned coating liquids 1, 2 and 3 were successively applied onto the first layer and dried in the same manner as in the preparation of the thermal transfer material (I), to form second, third and fourth layers each having a thickness of 2.5 microns after the drying.

Finally, the resultant product was left standing in a drier at 150° C. for 1 min., to obtain a thermal transfer material (II).

Thermal Transfer Material (III)

The above-mentioned coating liquids 1, 2 and 3 were successively applied onto a 4.5 micron-thick PET film and dried in the same manner as in the preparation of the thermal transfer material (I), to form first, second and third layers each having a thickness of 2.5 microns after the drying, whereby a thermal transfer material (III) was obtained.

Thermal Transfer Material (IV)

The above-mentioned coating liquid 4 was applied onto a 4.5 micron-thick PET film and then dried to form a 1 micron-thick first layer. Then, the above-mentioned coating liquids 1, 2 and 3 were successively applied onto the first layer and dried in the same manner as in the preparation of the thermal transfer material (I), to form second, third and fourth layers each having a thickness of 2.5 microns after the drying, whereby a thermal transfer material (IV) was obtained.

Thermal Transfer Material (V)

The above-mentioned coating liquid 3 was applied onto a 4.5 micron-thick PET film and then dried to form a 7.5 micron-thick ink layer, whereby a thermal transfer material (V) was obtained.

Results of recording operations

EXAMPLES 1-8

Repetitive recording was effected by using the above-mentioned thermal transfer materials (I) to (IV) and a thermal transfer recording apparatus (modification of Canoward-mini $\alpha$-10).

In these Examples 1 to 8, the recording head used for the repetitive recording was one wherein the distance d from the center of the heat-generating member 6a to the end of the substrate 6b was 1 mm or 0.3 mm. The printing speed was 20 letters/sec. and the heat generation power was 0.35 W/dot. The thermal transfer material was used repeatedly by placing a length of material which had already been wound up due in a previous printing operation on the supply side reel. The recording sheet used herein was a thermal transfer paper TC-65 (Bekk smoothness: 120 sec.)

The results are shown in the following Table 2.

TABLE 2

| Example No. | Distance d of recording head (mm) | Thermal transfer material used | Number of repetition of recording operation | Image quality | Remarks |
|---|---|---|---|---|---|
| 1 | 1 | I | 5 | Good | *1 |
| 2 | 1 | II | 8 | Good | *2 |
| 3 | 1 | III | 5 | Good | *1 |
| 4 | 1 | IV | 8 | Good | *2 |
| 5 | 0.3 | I | 8 | Good | *3 |
| 6 | 0.3 | II | 12 | Good | *4 |
| 7 | 0.3 | III | 8 | Good | *3 |
| 8 | 0.3 | IV | 13 | Good | *5 |

*1: Some uneveness in image density occurred at the time of sixth recording and thereafter.
*2: Some uneveness in image density occurred at the time of ninth recording and thereafter.
*3: Some decrease and uneveness in image density occurred at the time of ninth recording and thereafter.
*4: Some decrease and uneveness in image density occurred at the time of thirteenth recording and thereafter.
*5: Some decrease and uneveness in image density occurred at the time of fourteenth recording and thereafter.

COMPARATIVE EXAMPLES 1-5

Repetitive recording was effected by using the above-mentioned thermal transfer materials (II) to (V).

In these Comparative Examples 1 to 5, repetitive recording was effected in the same manner as in Examples 1 to 8 except that a recording head 6 was used wherein the distance d from the center of the heat-generating member 6a to the end of the substrate 6b was 1.5 mm or 2 mm.

The results are shown in the following Table 3. In such a case, the thermal transfer material which had been heated by means of the heat-generating member of the recording head was not peeled from the recording sheet immediately after the heating, and good results could not be obtained.

TABLE 3

| Comparative Example No. | Distance d of recording head (mm) | Thermal transfer material used | Number of repetition of recording operation | Image quality | Remarks |
|---|---|---|---|---|---|
| 1 | 1.5 | II | 0 | — | *7 |
| 2 | 2 | II | 0 | — | *7 |
| 3 | 2 | III | 1 | *6 | *8 |
| 4 | 2 | IV | 0 | — | *7 |
| 5 | 2 | V | 1 | *6 | *8 |

*6: Edge definition of the printed image was somewhat poor.
*7: The ink was not substantially transferred to the recording sheet (i.e., the ink remained attached to the thermal transfer material at the time of peeling).
*8: All of the ink corresponding to the heated portion was transferred from the support to the recording sheet at the time of first recording. Considerable unevenness in image density occurred at the time of second recording.

As described hereinabove, according to the present invention, there is provided a recording method using a thermal transfer material of which a heat-transferable ink layer is designed so that the melt viscosity provided thereby decreases from the support side toward the ink layer surface. In the present invention, such a thermal transfer material is heated by means of a recording head and immediately thereafter, the thermal transfer material is peeled from a recording medium, whereby high-quality images free of image density decrease may be obtained even when the thermal transfer material is used for recording many times. As a result, according to the present invention, the operating cost is reduced as compared with the conventional thermal transfer recording method.

Particularly, when recording is effected by using a recording head wherein the distance from the center of a heat-generating member to an end portion thereof is 1 mm or shorter, recorded image quality may be improved.

What is claimed is:

1. A thermal transfer recording method, comprising:

providing a thermal transfer material comprising a support and a heat-transferable ink layer which is capable of providing a melt viscosity such that said melt viscosity decreases in the direction of from the support side toward the surface side thereof, said thermal transfer material being housed in a cassette whereby said thermal transfer material can be re-used by turning said cassette over;

superimposing the thermal transfer material on a recording medium so that the heat-transferable ink layer contacts the recording medium;

heating the thermal transfer material from the support side thereof by means of a recording head corresponding to an image signal; and separating the thermal transfer material from the recording medium immediately after the heating;

reversing said thermal transfer material when said thermal transfer material is exhausted by turning said cassette over;

wherein said recording head comprises a substrate and a heat-generating member disposed thereon; and distance from the center of said heat-generating member to the trailing end of the substrate disposed downstream of the heat-generating member with respect to the movement of the thermal transfer material being 1 mm or shorter.

2. A method according to claim 1, wherein said melt viscosity of the heat-transferable ink layer decreases continuously.

3. A method according to claim 1, wherein said melt viscosity of the heat-transferable ink layer decreases stepwise.

4. A method according to claim 1, wherein said melt viscosity of the heat-transferable ink layer has a minimum value of $10$–$10^5$ mPa.S at 120° C., and has a maximum value of $10^3$–$10^7$ mPa.S at 120° C.

5. A method according to claim 1, wherein said thermal transfer material further comprises an intermediate layer disposed between the support and the heat transferable ink layer.

* * * * *

UNITED STATES PATENT AND TRADEMARK OFFICE
CERTIFICATE OF CORRECTION

PATENT NO. : 5,008,683

DATED : April 16, 1991

INVENTOR(S) : Takayuki Suzuki

It is certified that error appears in the above-identified patent and that said Letters Patent is hereby corrected as shown below:

COLUMN 1

Line 17, "quite." should read --quiet.--.

Line 43, "operation using" should read --operation. Using--.
Line 44, "unevenness" should read --is uneven--.
Line 52, "use" should read --uses--.

COLUMN 2

Line 17, "shorter." should read --less.--.
Line 41, "shorter," should read --less,--.

COLUMN 3

Line 32, "include;" should read --include:--.
Line 43, "o" should read --or--.
Line 45, "(according" should read --(measured according--.
Line 51, "Into" should read --Indo--.

COLUMN 4

Line 5, "herein-after." should read --hereinafter.--.
Line 9, "largest" should read --highest--.
Line 24, "FIG. 2,)" should read --FIG. 2),--.
Line 59, "continuously this" should read --continuously, and so this--.

UNITED STATES PATENT AND TRADEMARK OFFICE

CERTIFICATE OF CORRECTION

PATENT NO. : 5,008,683

DATED : April 16, 1991

INVENTOR(S) : Takayuki Suzuki

It is certified that error appears in the above-identified patent and that said Letters Patent is hereby corrected as shown below:

COLUMN 5

Line 2, "causing" should be deleted.
Line 22, "cause cohesive failure in the ink layer possible to" should be deleted.
Line 26, "than thermal" should read --than a thermal--.
Line 55, "core 4b," should read --core 4b--.
Line 63, "direction" should read --movement direction--.
Line 64, "movement" should be deleted.
Line 68, "presses," should read --presses--.

COLUMN 6

Line 2, "back surface" should be deleted.
Line 9, "fed," should read --fed--.
Line 59, "the transferred" should read --be transferred--.
Line 61, "in" should read --is--.

COLUMN 7

Line 40, "smaller" should be deleted.
Line 51, "center b the" should read --center b of the--.
Line 55, "preferred" should read --preferable--.

COLUMN 8

Line 10, "3, is used" should read --3 is used,--.
Line 13, "becomes" should read --become--.

UNITED STATES PATENT AND TRADEMARK OFFICE
CERTIFICATE OF CORRECTION

PATENT NO. : 5,008,683

DATED : April 16, 1991

INVENTOR(S) : Takayuki Suzuki

It is certified that error appears in the above-identified patent and that said Letters Patent is hereby corrected as shown below:

COLUMN 10

Line 3, "due" should be deleted.
Line 12, "uneveness" should read --unevenness-- (all occurrences).

COLUMN 11

Line 4, "shorter," should read --less,--.

COLUMN 12

Line 6, "and" should read --the--.
Line 23, "heat trans-" should read --heat-trans---.

Signed and Sealed this

Thirteenth Day of July, 1993

Attest:

Michael K. Kirk

MICHAEL K. KIRK

Attesting Officer

Acting Commissioner of Patents and Trademarks